June 27, 1961 R. C. MOORE 2,990,446

COLOR TELEVISION RECEIVER

Filed Dec. 3, 1956 2 Sheets-Sheet 1

INVENTOR.
ROBERT C. MOORE
BY
[signature]
ATTORNEY

June 27, 1961 R. C. MOORE 2,990,446

COLOR TELEVISION RECEIVER

Filed Dec. 3, 1956 2 Sheets-Sheet 2

INVENTOR.
ROBERT C. MOORE
BY
Dean V. Hazeltine
ATTORNEY

United States Patent Office 2,990,446
Patented June 27, 1961

2,990,446

COLOR TELEVISION RECEIVER

Robert C. Moore, Huntingdon Valley, Pa., assignor to Philco Corporation, Philadelphia, Pa., a corporation of Pennsylvania Filed Dec. 3, 1956, Ser. No. 625,772
13 Claims. (Cl. 178—5.4)

Figure 1:
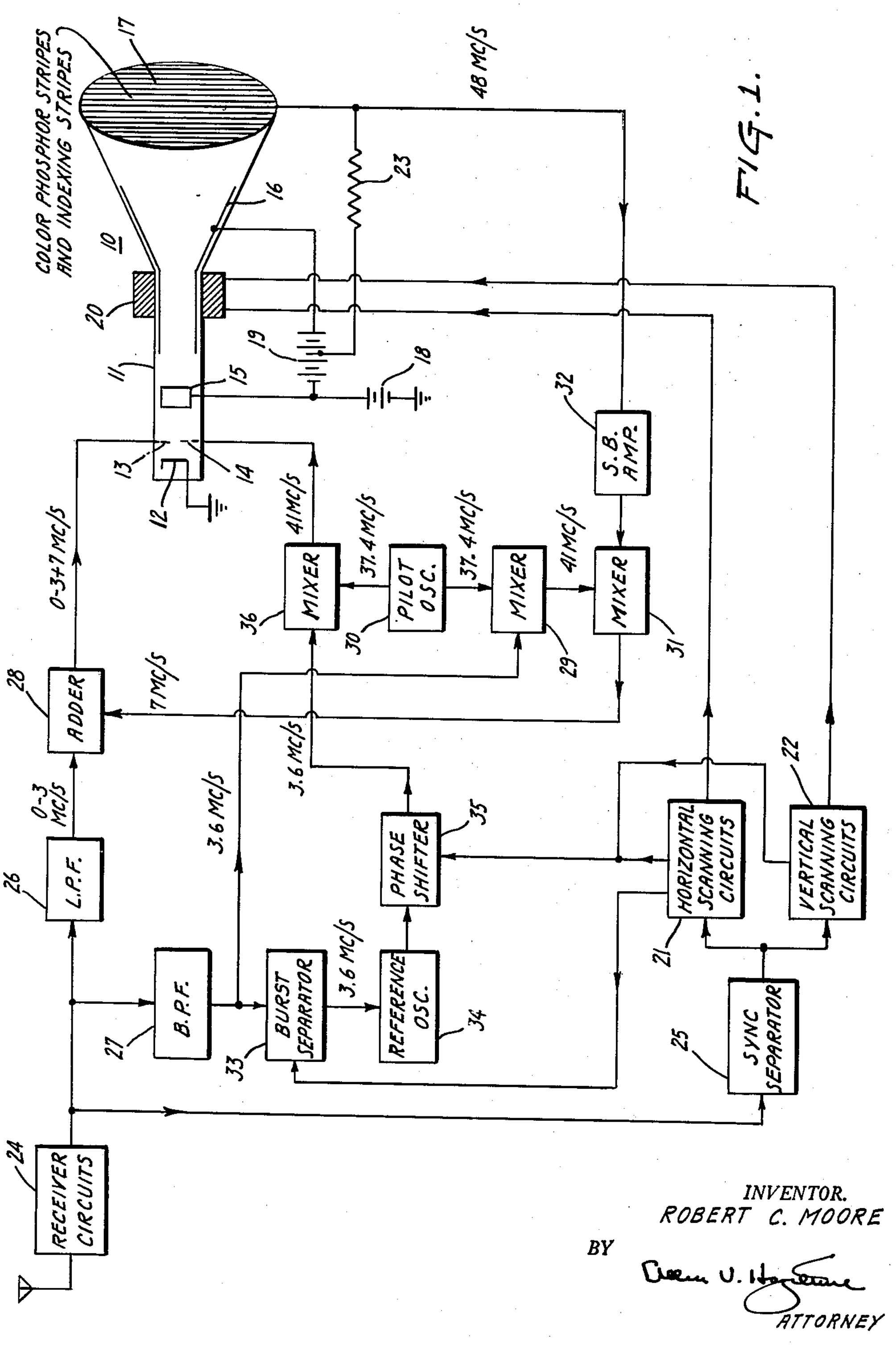

This invention relates to color television receivers which employ a single image-reproducing cathode ray tube having a beam-intercepting screen structure and indexing means arranged in cooperative relationship with said structure and adapted to produce an indexing signal indicative of the instantaneous position of the image-reproducing cathode ray beam.

The invention is particularly adapted for, and will be described in connection with, a color television receiver employing a cathode ray tube in which a beam-intercepting image-forming screen member comprises vertical stripes of luminescent materials. These stripes are preferably arranged in laterally-displaced color triplets, each triplet comprising three vertical phosphor stripes which respond to the electron impingement to produce light of the different primary colors. The order of arrangement of the stripes may be such that the horizontally-scanning cathode ray beam produces red, green and blue light successively. From the television receiver circuits there is derived a color video signal having signal components definitive of the brightness and chromaticity of the image to be reproduced, which signal is utilized to control the intensity of the cathode ray beam to the required instantaneous value as the beam scans the phosphor stripes.

For proper color rendition, it is required that, as the phosphor stripe producing a given one of the primary colors of light of a particular image elementt is impinged by the cathode ray beam, the intensity of the beam be simultaneously controlled in response to the contemporaneous value of the video signal representing the corresponding color component of the televised image. Such a synchronous relationship may be maintained throughout the scanning cycle by deriving an indexing signal indicative of the instantaneous position of the cathode ray beam upon the image-forming screen, and by utilizing the signal to effect the required coordination between beam position and beam modulation. The indexing signal may be derived from a plurality of stripe members arranged on the beam-intercepting screen structure, each adjacent to a color triplet so that, when the beam scans the screen, the indexing stripes are excited in spaced time sequence relative to the scanning of the color triplets, and a series of pulses is generated in a suitable output electrode system of the cathode ray tube.

The indexing stripes may comprise a material having secondary-emissive properties which differ from the secondary-emissive properties of the remaining portions of the beam intercepting structure. For example, such indexing stripes may consist of a high atomic number material such as gold, platinum or tungsten, or may consist of certain oxides, such as cesium oxide or magnesium oxide. Alternatively, the indexing stripes may consist of a fluorescent material, such as zinc oxide, having a spectral output in the non-visible light region, and the indexing signal may be derived from a suitable photoelectric cell arranged, for example, in a side wall portion of the cathode ray tube out of the path of the cathode ray beam and facing the beam intercepting surface of the screen structure.

In a color television receiver of the general character here involved, any change of phase of the indexing signal will adversely affect the aforementioned coordination and may produce color error in the reproduced image. For example, where secondary electron emission is employed to produce the indexing signal, variations in transit time of the secondary electrons over the screen area may adversely affect the aforementioned coordination and thus cause color error in the image.

One solution of this problem is disclosed and claimed in a copending application of J. S. Bryan, Serial No. 603,622, filed August 13, 1956, now Patent No. 2,899,600. As described in that application, by suitable design of the cathode ray tube, the phase changes of the indexing signal during each line scan and during each frame scan may be caused to take the form of a simple geometric curve, such as a parabola. In the system disclosed and claimed in the Bryan application, compensation for the undesired phase changes is effected by modifying the scanning rate during each line scan and during each frame scan according to the geometric curves representing the phase changes.

The principal object of the present invention is to provide another solution of the problem. This invention is based on the concept of introducing compensating or corrective phase shift in the system so as substantially to nullify the undesired phase changes.

In accordance with this invention, there is provided a color television receiver comprising an image-producing cathode ray tube adapted to produce an indexing signal indicative of the instantaneous position of the cathode ray beam upon the image-forming screen of the tube, means for effecting scanning movement of said beam, means for supplying a color video wave to said tube to modulate said beam, means for utilizing said indexing signal to effect coordination between the beam position and the beam modulation, the indexing signal being subject to the aforementioned phase variations which tend adversely to affect said coordination, a phase shifter arranged to control said coordination, means for producing a corrective signal representative of said variations, and means for controlling said phase shifter according to said corrective signal so as to nullify the effect of said variations on said coordination.

In the preferred form of color television receiver of the general character here involved, the coordination between the beam position and the beam modulation is effected by controlling the phase of the color video wave both by a color reference signal and by the indexing signal. The color reference signal is derived from the color burst which provides a phase reference for the color components of the color video wave. In accordance with this invention, in such a receiver the above-mentioned compensating or corrective phase shift may be applied at any point where it will serve the desired purpose of maintaining proper coordination between beam position and phase of the color video wave. In the preferred embodiment of the invention, as hereinafter described, the compensating or corrective phase shift is applied to the color reference signal.

While the present invention is applicable to any color television receiver employing an index-type cathode ray tube, it is preferably applied to a receiver wherein a dual beam cathode ray tube is employed, one beam serving as the image-reproducing beam, and the other serving as the indexing beam, and wherein the intensity of the indexing beam is varied at a pilot carrier rate. Such a system is shown, for example, in U.S. Patent No. 2,725,421 issued November 29, 1955 to S. F. Valdes. In such a system, the derived indexing signal is a modulation product representing the sum or difference of the pilot carrier frequency and the rate of scanning the indexing stripes.

A further object of the present invention therefore is to prevent undesired adverse effect upon the aforementioned coordination in such a system.

Figure 2:
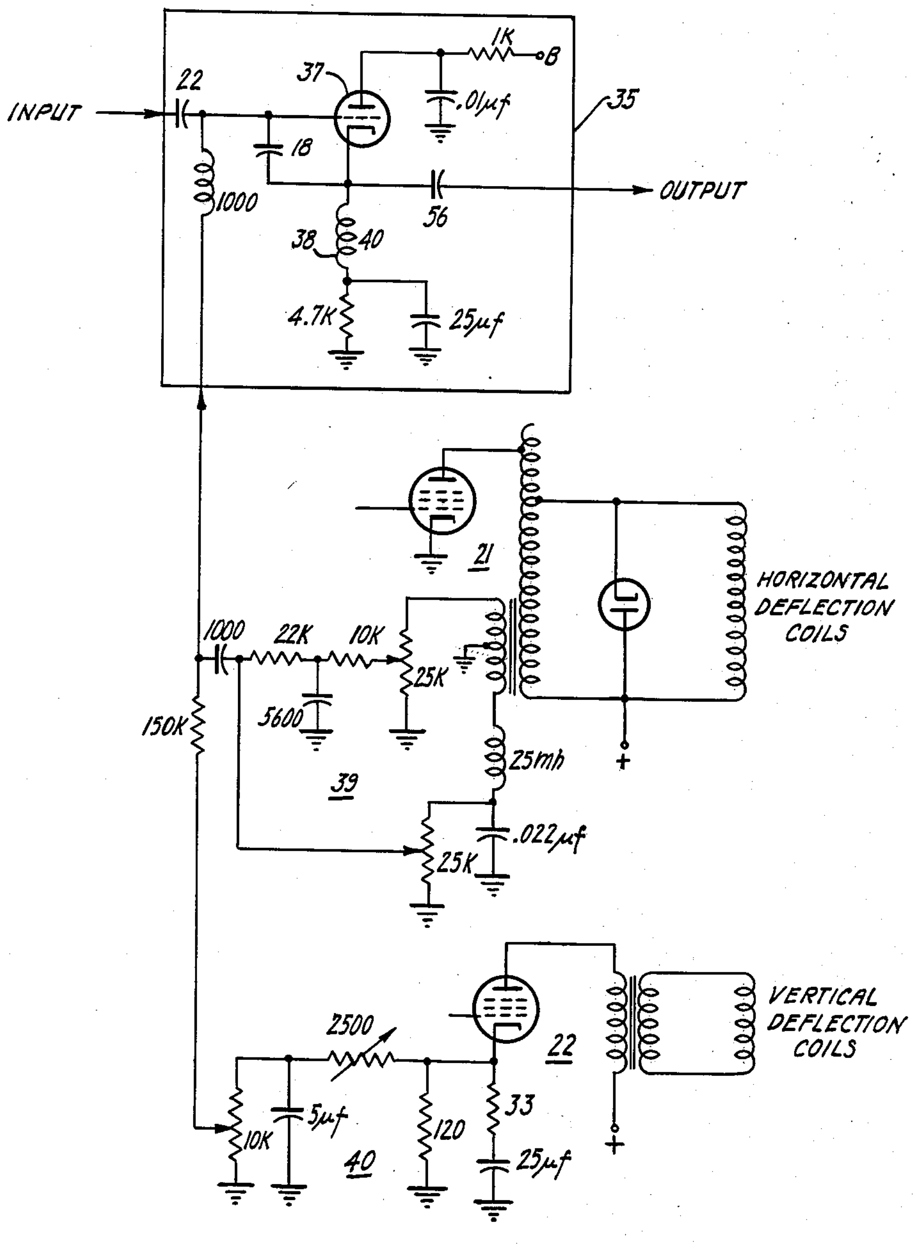

Other objects and features of the invention will be apparent from the following detailed description with reference to the accompanying drawings, wherein FIG. 1 is a block diagram of a color television receiver employing the preferred embodiment of the present invention;

FIG. 2 is a schematic illustration of a phase shifter and control signal-deriving network which may be employed in the receiver of FIG. 1.

Referring first to FIG. 1, the color television receiver illustrated comprises a cathode ray tube 10 containing within an evacuated envelope 11 a dual beam generating and intensity control system comprising a cathode 12, control electrodes 13 and 14, a focussing anode 15 and an accelerating anode 16, the latter of which may consist of a conductive coating on the inner wall of the envelope 11, as well understood in the art. Electrodes 15 and 16 are maintained at their desired operating potentials by suitable voltage sources shown for convenience as batteries 18 and 19, the battery 18 having its positive terminal connected to the anode 15 and its negative terminal connected to a point at ground potential, and the battery 19 having its negative terminal connected to anode 15 and its positive terminal connected to anode 16. In practice, the source 18 has a potential of the order of 1 to 3 kilovolts whereas the source 19 has a potential of the order of 10 to 20 kilovolts.

A deflection yoke 20, connected to the horizontal and vertical scanning circuits 21 and 22, is provided for deflecting the dual electron beams across the faceplate 17 of the tube to form a raster thereon.

The faceplate 17 is provided with a beam-intercepting structure of the character hereinbefore described, such structure preferably comprising color phosphor stripes and indexing stripes arranged vertically so as to be scanned transversely during successive horizontal line scannings. Suitable forms of such structure are disclosed in a copending application of C. Bocciarelli, Serial No. 198,709 filed December 1, 1950. For the present purpose, it may be assumed that the beam-intercepting structure is formed directly on the faceplate 17, which may therefore be regarded as the screen on which the image is reproduced. The beam-intercepting structure is connected through a load impedance 23 to source 19 so as to be at a somewhat lower potential than the anode 16.

Since the dual cathode ray beams are deflected by the common deflection yoke 20, they simultaneously scan the screen 17, and indexing information derived from one of the beams is indicative of the position of the other beam. The indexing information is derived by virtue of secondary electron emission from the screen 17 to the anode 16. When the indexing beam, i.e., the beam under control of the electrode 14, is varied in intensity at a pilot frequency, as by means of a pilot oscillator, the so varied beam will generate across the load resistor 23, an indexing signal comprising a carrier component at the pilot frequency and sideband components representing the sum and difference of the pilot frequency and the rate at which the index stripes are scanned by the beam. Changes in the rate of scanning the index stripes produce corresponding changes in the frequencies of the sideband components about their respective nominal values, so that one of the sidebands may be used as an indexing signal, as hereinafter described.

For supplying a color video signal to the control grid 13, there are provided within block 24 the usual receiver circuits which may include the usual radio frequency amplifier, frequency conversion and detector stages for producing a color video signal.

In a typical form, the color video signal comprises time-spaced horizontal and vertical synchronizing pulses recurrent at the horizontal and vertical scanning frequencies, and the color video wave occurring in the intervals between the horizontal pulses. As well understood, the color video wave includes successively occurring components representative respectively of different chromatic aspects of elemental areas of an image to be reproduced. The video signal further includes a reference signal for providing a phase reference for the color components of the color video wave, such reference signal usually being in the form of a burst of a small number of cycles of carrier signal having a frequency equal to the frequency of the chromaticity subcarrier component of the video wave and occurring during the so-called backporch interval of the horizontal synchronizing pulses.

The deflection synchronizing pulses contained in the received video signal are selected by a sync signal separator 25 of conventional form, and the separated synchronizing pulses serve to energize, in well known manner, the horizontal and vertical scanning circuits 21 and 22.

The color video signal is separated into its brightness and chromaticity components by means of a low pass filter 26 and a bandpass filter 27, whereby at the output of filter 26 there is derived the low frequency (e.g. 0–3 mc./sec.) component of the video signal containing the brightness information of the image, and at the output of the filter 27 there is derived the modulated high frequency (e.g. 3.6 mc./sec.) subcarrier component of the vido signal containing the chromaticity information of the image and the reference signal.

The brightness signal is supplied to the control grid 13 of the cathode ray tube 10 through an adder 28 having two inputs and a common output.

The chromaticity information, derived from the bandpass filter 27, is supplied to a mixer 29. The latter is also supplied by a pilot oscillator 30. The heterodyne output of mixer 29, which includes the chromaticity information, is supplied to a second mixer 31. The indexing signal, derived by way of sideband amplifier 32, is also supplied to the mixer 31, so that the color-representative signal output of mixer 31 is phased according to the indexing information supplied through the sideband amplifier 32.

The burst separator 33 operates to separate the burst from the color video wave by providing a gated path for the applied input signal during the time of occurrence of the burst. Such a gate may consist, for example, of a dual grid electron discharge tube having one control grid coupled to the output of the bandpass filter 27 and a second control grid so negatively biased as normally to prevent conduction through the tube. The tube is made conductive at the proper instant, i.e, during the backporch interval of the horizontal synchronizing pulses, by means of a positive pulse which may be derived from the output of the horizontal scanning generator in well known manner, and which is applied to the second control grid to override the normal blocking bias.

The separated burst is applied to the reference oscillator 34 which is adapted to generate a signal having a frequency and a phase as established by the frequency and phase of the burst. Disregarding for the moment the phase shifter 35, the output of oscillator 34 is applied to a mixer 36 together with a signal from the pilot oscillator 30 to produce a heterodyne signal which has the color phase information as established by the burst. This heterodyne signal is supplied to the control grid 14 of the cathode ray tube 10, and it varies the intensity of the indexing beam at a pilot carrier rate, as hereinbefore described.

In the system illustrated, the pilot oscillator frequency is 37.4 mc./sec., and the additive heterodyne action of mixer 36 produces a 41 mc./sec. output which is supplied to control electrode 14. Assuming that the rate of scanning the index stripes is approximately 7 million per second as determined by the horizontal scanning rate and the number of index stripes, a modulated signal at 41 mc./sec. and having sideband components at approximately 34 mc./sec. and 48 mc./sec. is produced across the load resistor 23. The upper sideband component is used in this instance and is supplied to the mixer 31 through the sideband amplifier 32.

Through additive heterodyne action of mixer 29, a 41 mc./sec. signal is also supplied to mixer 31. The latter, by subtractive heterodyne action, produces a 7 mc./sec. signal which contains the chromaticity information and which is supplied to the adder 28. This signal also contains the indexing information in the form of frequency variations about its nominal value corresponding to the frequency variations of the indexing signal supplied through the sideband amplifier 32.

From the foregoing description, it will be seen that the phase of the color video wave supplied to the adder 28 from mixer 31 is determined by the phase of the color reference signal derived from oscillator 34 and by the indexing signal derived by the scanning of the index stripes. It will also be seen that a change of phase of the indexing signal will cause a corresponding change of phase of the color video wave. In any system of this general type, there are inevitable cyclic changes of phase of the indexing signal during the successive line and frame scannings, due to the physical character of the cathode ray tube, and these phase changes tend to produce color error in the reproduced image. While it is possible, by suitable design of the cathode ray tube, to cause these cyclic phase changes to take the form of simple geometric curves, it is difficult to eliminate them completely. For example, as described in the aforementioned Bryan application, phase changes of the indexing signal due to different transit times of secondary electrons during each horizontal scan and during each vertical scan may be caused to take the form of a simple geometric curve, such as a parabola, by suitable arrangement of the screen and the collector electrode and by suitable adjustment of the voltages applied thereto.

It is also known that it is readily possible to derive from the horizontal and vertical scanning circuits a voltage waveform which varies according to simple geometric curves representing phase changes of the indexing signal during each horizontal scan and during each vertical scan.

In accordance with the present invention, the phase changes of the indexing signal are effectively nullified by deriving from the horizontal and vertical scanning circuits a corrective signal representative of said phase changes, and by utilizing such signal to effect compensating or correcting phase shift in such a manner as to maintain the coordination between beam position and beam modulation which is essential to proper color rendition.

Referring to the system of FIG. 1, while the compensating or correcting phase shift may be introduced at any suitable point in the system, it is preferred to apply the phase shift to the color reference signal supplied by the reference oscillator 34. Accordingly, the phase shifter 35 is provided in the connection between the oscillator 34 and the mixer 36, and the phase shifter is controlled by means of a corrective signal derived from the horizontal and vertical scanning circuits. It is essential, of course, that the corrective signal be representative of the phase changes caused by the physical character of the cathode ray tube 10 in the generation of the indexing signal. To this end, the cathode ray tube may be constructed so as to cause the phase changes during the horizontal and vertical scans to take the form of simple geometric curves, as described in the aforementioned Bryan application, and the corrective signal derived from the horizontal and vertical scanning circuits may be of proper waveform to vary according to said curves. Of course, the phase shift produced by the corrective signal must be in the proper sense to nullify the effect of the offending phase change.

In the system shown in FIG. 1, the effect of the corrective phase shift is to shift the phase of the output signal from mixer 36 in a sense opposite to the offending phase change. The result is that the offending phase change is nullified, and the indexing signal supplied to mixer 31 is substantially free of undesired phase changes. Consequently, such phase changes are not imparted to the color video wave which is supplied to adder 28 from mixer 31.

Having in mind that the objective is to prevent undesired phase shift of the color video wave supplied to the control grid 13 of the cathode ray tube 10, it will be apparent that this objective may be achieved by introducing the corrective phase shift at other points in the system. For example, the corrective phase shift could be applied to the output signal of mixer 31. Then, while the indexing signal supplied to mixer 31 would contain phase error which would appear in the output of mixer 31, the corrective phase shift would counteract or nullify such error.

The phase shifter 35 may be of any suitable form, such as shown in FIG. 2. This form has been employed in the practice of the invention, it being generally of the type disclosed in U.S. Patent No. 2,456,716 issued December 21, 1948 to S. W. Lewinter. In this form, the phase shifter comprises a vacuum tube 37, which may be a triode, and the associated circuit elements including the inductance coil 38 connected in the cathode circuit. The input signal and the control signal are supplied to the control grid. The phase-controlled output signal is derived from across the coil 38. The operation of this type of circuit is well known and is described, for example, in the above-mentioned Lewinter patent.

The control signal may be derived from the horizontal and vertical scanning circuits by any suitable arrangement, such as that shown in FIG. 2 which has been employed in the practice of the invention. In this arrangement, signal components are derived from the horizontal and vertical scanning circuits 21 and 22 by means of networks 39 and 40, and are combined to constitute the control signal.

In FIG. 2, suitable values of the circuit components are indicated. Of course, these are given merely by way of example and they are not intended to impose any limitation.

While a preferred embodiment of the invention has been illustrated and described, it is to be understood that the invention is not limited thereto but contemplates such modifications and other embodiments as may occur to those skilled in the art.

I claim:

1. In a color television receiver, an image-reproducing cathode ray tube including means for producing an indexing signal indicative of the instantaneous position of the cathode ray beam upon the image-forming screen of said tube, means including scanning circuits for effecting scanning movement of said beam, means for supplying a color video wave to said tube to modulate said beam, means for utilizing said indexing signal to effect coordination between the beam position and the beam modulation, said indexing signal being subject to undesired variations which tend adversely to affect said coordination, means for deriving from said scanning circuits a corrective signal representative of said variations, and means controlled by said corrective signal for nullifying said variations.

2. In a color television receiver, an image-reproducing cathode ray tube including means for producing an indexing signal indicative of the instantaneous position of the cathode ray beam upon the image-forming screen of said tube, means for effecting scanning movement of said beam, means for supplying a color video wave to said tube to modulate said beam, means for utilizing said indexing signal to effect coordination between the beam position and the beam modulation, said indexing signal being subject to undesired phase variations which tend adversely to affect said coordination, means comprising a phase shifter for controlling said coordination, means for producing a corrective signal representative of said variations, and means for controlling said phase shifter according to said corrective signal so as to nullify the effect of said variations on said coordination.

3. In a color television receiver, an image-reproducing cathode ray tube including means for producing an indexing signal indicative of the instantaneous position of the cathode ray beam upon the image-forming screen of said tube, means including scanning circuits for effecting scanning movement of said beam, means for supplying a color video wave to said tube to modulate said beam, means for controlling the phase of said wave according to said indexing signal, the latter being subject to undesired variations which tend to produce undesired phase shifts of said wave, means comprising a phase shifter for effecting additional control of the phase of said wave, means for deriving from said scanning circuits a corrective signal representative of said variations, and means for controlling said phase shifter according to said corrective signal so as to prevent the undesired phase shifts of said wave.

4. In a color television receiver, an image-reproducing cathode ray tube including means for producing an indexing signal indicative of the instantaneous position of the cathode ray beam upon the image-forming screen of said tube, means for effecting scanning movement of said beam, receiver circuits for supplying a color video wave and a color reference signal, means for supplying said wave to said tube for reproduction of the image, means for controlling the phase of said wave according to said indexing signal and the phase of said color reference signal, the indexing signal being subject to undesired variations which tend to produce undesired phase shifts of said wave, means for producing a corrective signal representative of said variations, and means for shifting the phase of said color reference signal according to said corrective signal so as to prevent the undesired phase shifts of said wave.

5. In a color television receiver, an image-reproducing cathode ray tube including means for producing an indexing signal indicative of the instantaneous position of the cathode ray beam upon the image-forming screen of said tube, means including scanning circuits for effecting scanning movement of said beam, receiver circuits for supplying a color video wave and a color reference signal, means for supplying said wave to said tube for reproduction of the image, means for controlling the phase of said wave according to said indexing signal and the phase of said color reference signal, the indexing signal being subject to undesired variations which tend to produce undesired phase shifts of said wave, controllable phase shifting means for varying the phase of said color reference signal, means for deriving from said scanning circuits a corrective signal representative of said variations, and means for controlling said phase shifting means according to said corrective signal so as to control the phase of said color reference signal and thus prevent the undesired phase shifts of said wave.

6. In a color television receiver, an image-reproducing cathode ray tube of the dual beam type having two control electrodes and means activated by one beam for producing an indexing signal indicative of the instantaneous position of the other beam upon the image-forming screen of said tube, means for effecting scanning movement of said beams, receiver circuits for supplying a color video wave and a color reference signal, means for applying to the control electrode for said one beam a signal having the same phase as said reference signal and serving to establish the phase of said indexing signal, means for controlling the phase of said wave according to said indexing signal, the latter being subject to undesired variations which tend to produce undesired phase shifts of said wave, means for producing a corrective signal representative of said variations, means for shifting the phase of said color reference signal according to said corrective signal so as to prevent the undesired phase shifts of said wave, and means for supplying said wave to the other control electrode of said tube for reproduction of the image.

7. In a color television receiver, an image-reproducing cathode ray tube of the dual beam type having two control electrodes and means activated by one beam for producing an indexing signal indicative of the instantaneous position of the other beam upon the image-forming screen of said tube, means including scanning circuits for effecting scanning movement of said beams, receiver circuits for supplying a color video wave and a color reference signal, means for applying to the control electrode for said one beam a signal having the same phase as said reference signal and serving to establish the phase of said indexing signal, means for controlling the phase of said wave according to said indexing signal, the latter being subject to undesired variations which tend to produce undesired phase shifts of said wave, controllable phase shifting means for varying the phase of said color reference signal, means for deriving from said scanning circuits a corrective signal representative of said variations, means for controlling said phase shifting means according to said corrective signal so as to control the phase of said color reference signal and thus prevent the undesired phase shifts of said wave, and means for supplying said wave to the other control electrode of said tube for reproduction of the image.

8. In a color television receiver, an image-reproducing cathode ray tube including means for producing an indexing signal indicative of the instantaneous position of the cathode ray beam upon the image-forming screen of said tube, means for effecting scanning movement of said beam, receiver circuits for supplying a composite color television signal having components representative respectively of luminance and chrominance components of an image to be reproduced, means for supplying the luminance component to said tube, means for deriving the chrominance component in the form of a color video wave, means for controlling the phase of said wave according to said indexing signal, the latter being subject to undesired variations which tend to produce undesired phase shifts of said wave, phase shifting means for effecting additional control of the phase of said wave, means for producing a corrective signal representative of said variations, means for controlling said phase shifting means according to said corrective signal so as to prevent the undesired phase shifts of said wave, and means for supplying said wave to said tube for color rendition in the reproduced image.

9. In a color television receiver, an image-reproducing cathode ray tube including means for producing an indexing signal indicative of the instantaneous position of the cathode ray beam upon the image-forming screen of said tube, means including scanning circuits for effecting scanning movement of said beam, receiver circuits for supplying a composite color television signal having components representative respectively of luminance and chrominance components of an image to be reproduced, means for supplying the luminance component to said tube, means for deriving the chrominance component in the form of a color video wave, means for controlling the phase of said wave according to said indexing signal, the latter being subject to undesired variations which tend to produce undesired phase shifts of said wave, means for deriving from said scanning circuits a corrective signal representative of said variations, means controlled by said corrective signal for preventing the undesider phase shifts of said wave, and means for supplying said wave to said tube for color rendition in the reproduced image.

10. In a color television receiver, an image-reproducing cathode ray tube including means for producing an indexing signal indicative of the instantaneous position of the cathode ray beam upon the image-forming screen of said tube, means for effecting scanning movement of said beam, receiver circuits for supplying a composite color television signal having components representative respectively of luminance and chrominance components of an image to be reproduced, and also having a color reference component, means for supplying the luminance component of said signal to said tube, means for deriving the chrominance component of said signal in the form of a color video wave, means for supplying said wave to said tube for color rendition in the reproduced image, means for controlling the phase of said wave according to said indexing signal and the phase of said color reference component, the indexing signal being subject to undesired variations which tend to produce undesired phase shifts of said wave, controllable phase shifting means for varying the phase of said color reference component so as to effect additional control of the phase of said wave, means for producing a corrective signal representative of said variations, and means for controlling said phase shifting means according to said corrective signal so as to prevent the undesired phase shifts of said wave.

11. In a color television receiver, an image-reproducing cathode ray tube including means for producing an indexing signal indicative of the instantaneous position of the cathode ray beam upon the image-forming screen of said tube, means including scanning circuits for effecting scanning movement of said beam, receiver circuits for supplying a composite color television signal having components representative respectively of luminance and chrominance components of an image to be reproduced, and also having a color reference component, means for supplying the luminance component of said signal to said tube, means for deriving the chrominance component of said signal in the form of a color video wave, means for supplying said wave to said tube for color rendition in the reproduced image, means for controlling the phase of said wave according to said indexing signal and the phase of said color reference component, the indexing signal being subject to undesired variations which tend to produce undesired phase shifts of said wave, controllable phase shifting means for varying the phase of said color reference component so as to effect additional control of the phase of said wave, means for deriving from said scanning circuits a corrective signal representative of said variations, and means for controlling said phase shifting means according to said corrective signal so as to control the phase of said color reference component and thus prevent the undesired phase shifts of said wave.

12. In a color television receiver, an image-reproducing cathode ray tube of the dual beam type having two control electrodes and means activated by one beam for producing an indexing signal indicative of the instantaneous position of the other beam upon the image-forming screen of said tube, means for effecting scanning movement of said beams, receiver circuits for supplying a composite color television signal having components representative respectively of luminance and chrominance components of an image to be reproduced, and also having a color reference component, means for applying to the control electrode for said one beam a signal having the same phase as said color reference component and serving to establish the phase of said indexing signal, means for supplying the luminance component of said television signal to the other control electrode of said tube, means for deriving the chrominance component of said television signal in the form of a color video wave, means for controlling the phase of said wave according to said indexing signal, the latter being subject to undesired variations which tend to produce undesirable phase shifts of said wave, means for producing a corrective signal representative of said variations, means for shifting the phase of said color reference component according to said corrective signal so as to prevent the undesired phase shifts of said wave, and means for supplying said wave to said other electrode for color rendition in the reproduced image.

13. In a color television receiver, an image-reproducing cathode ray tube of the dual beam type having two control electrodes and means activated by one beam for producing an indexing signal indicative of the instantaneous position of the other beam upon the image-forming screen of said tube, means including scanning circuits for effecting scanning movement of said beams, receiver circuits for supplying a composite color television signal having components representative respectively of luminance and chrominance components of an image to be reproduced, and also having a color reference component, means for applying to the control electrode for said one beam a signal having the same phase as said color reference component and serving to establish the phase of said indexing signal, means for supplying the luminance component of said television signal to the other control electrode of said tube, means for deriving the chrominance component of said television signal in the form of a color video wave, means for controlling the phase of said wave according to said indexing signal, the latter being subject to undesired variations which tend to produce undesired phase shifts of said wave, controllable phase shifting means for varying the phase of said color reference component, means for deriving from said scanning circuits a corrective signal representative of said variations, means for controlling said phase shifting means according to said corrective signal so as to control the phase of said color reference component and thus prevent the undesired phase shifts of said wave, and means for supplying said wave to said other electrode for color rendition in the reproduced image.

References Cited in the file of this patent

UNITED STATES PATENTS

| | | |
|---|---|---|
| 2,725,421 | Valdes | Nov. 29, 1955 |
| 2,831,052 | Boothroyd | Apr. 15, 1958 |
| 2,862,999 | Fairhurst | Dec. 2, 1958 |